United States Patent [19]
Edwards et al.

[11] Patent Number: 5,375,183
[45] Date of Patent: Dec. 20, 1994

[54] OVERMOLDED ALIGNMENT FERRULE

[75] Inventors: Bryan T. Edwards, Camp Hill; David D. Erdman, Hummelstown; Kevin T. Monroe, Harrisburg, all of Pa.

[73] Assignee: The Whitaker Corporation, Wilmington, Del.

[21] Appl. No.: 214,054

[22] Filed: Mar. 15, 1994

Related U.S. Application Data

[63] Continuation of Ser. No. 66,849, May 25, 1993, abandoned.

[51] Int. Cl.[5] ............................ G02B 6/00; G02B 6/36
[52] U.S. Cl. .......................................... 385/60; 385/88
[58] Field of Search ................... 385/60, 66, 69, 75, 385/76, 78, 86, 88

[56] References Cited

U.S. PATENT DOCUMENTS

| | | | |
|---|---|---|---|
| 4,634,214 | 1/1987 | Cannon, Jr. et al. | 385/80 X |
| 4,834,487 | 5/1989 | Abendschein et al. | 385/78 |
| 5,013,122 | 5/1991 | Savitsky et al. | 385/81 |
| 5,193,133 | 3/1993 | Schofield et al. | 385/85 |

*Primary Examiner*—Akm E. Ullah
*Attorney, Agent, or Firm*—Driscoll A. Nina, Jr.

[57] ABSTRACT

An overmolded alignment ferrule for an optical fiber connector having a high precision preformed precision portion and a lower precision overmolded body portion, the precision portion including an anti-displacement feature and a anti-flexural feature for preventing flexural, rotational or torsional movement of the precision portion relative the body portion. The overmolded alignment ferrule being formed by overmolding the body portion about the precision portion generally surrounding and embedding the anti-displacement features and the anti-flexure features and extending rearward therefrom.

17 Claims, 7 Drawing Sheets

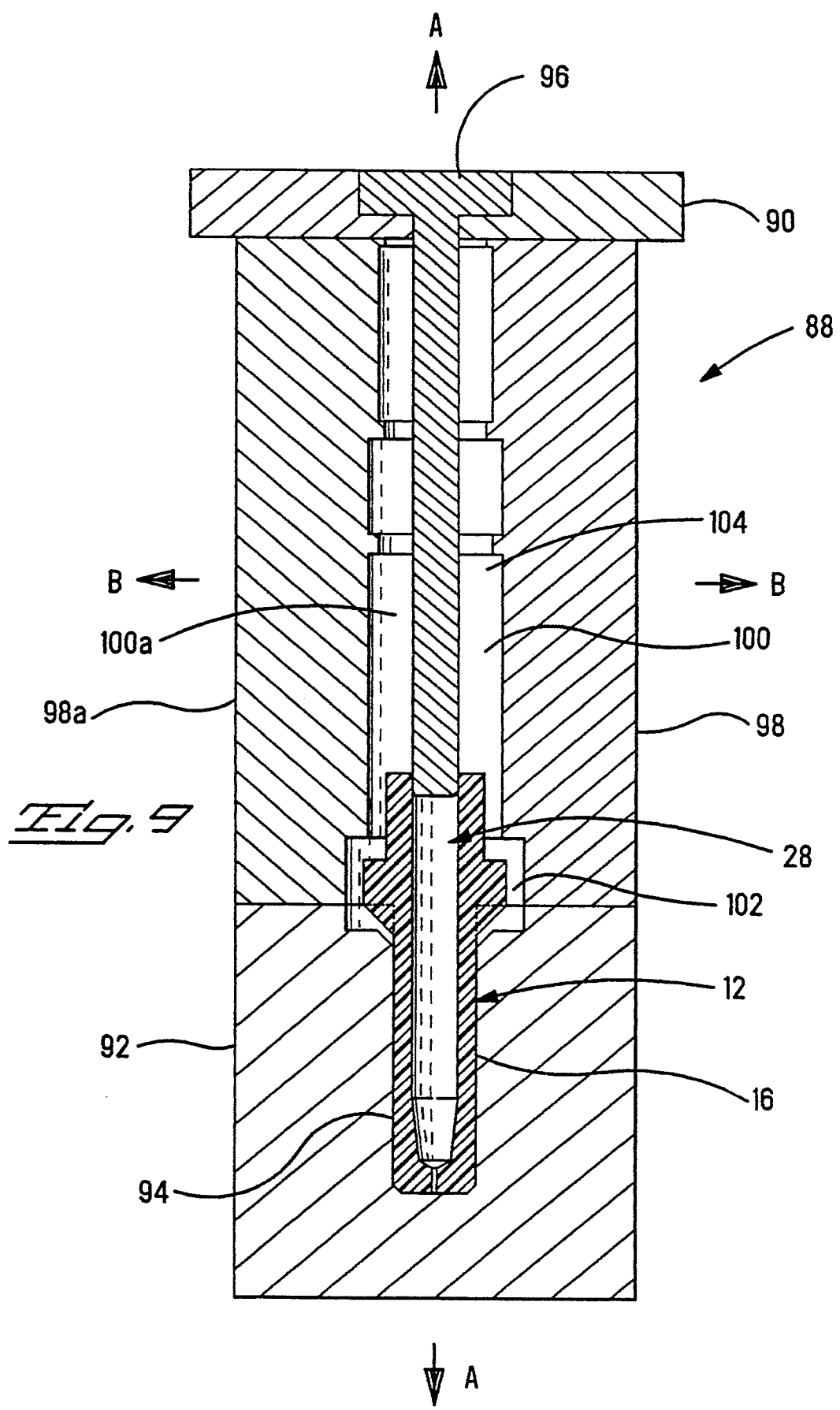

OVERMOLDED ALIGNMENT FERRULE

This application is a continuation of application Ser. No. 08/066,849 filed May 25, 1993, now abandoned.

FIELD OF THE INVENTION

This application relates to alignment ferrules used in optical fiber connectors for aligning optical fibers with mating fiber optic devices.

BACKGROUND OF THE INVENTION

A fiber optic connector within the field of this invention utilizes the precise dimensions of an alignment ferrule to accurately align an optical fiber therein with a mating fiber optic device. Typically, the ferrule will have a high precision front section that is concentric with a central passage in which the optical fiber is held, whereby orientation of the front section also orientates the corresponding optical fiber. A lower precision body portion is used to incorporate the ferrule into the fiber optic connector. These ferrules may be used either singularly or in conjunction with others.

Ferrules have been manufactured using a variety of methods to accommodate the high precision, and its associated costs, at the front section, while realizing cost savings through the lower precision requirements of the body portion. U.S. Pat. No. 4,634,214 discloses a two-piece ferrule where the front section is a cylindrical ceramic piece that is frictionally fit or bonded within a collar of a lower precision rear section.

U.S. Pat. No. 5,013,122 discloses a ferrule that is made from metal or thermoplastic material having the high precision front section and the body portion integrally formed. A bipartite ferrule may also be produced by attaching the front section to the rear body portion through the use of mechanical means, such as threads or bosses, or through bonding means, such as the use of heat, ultrasonic, or adhesive techniques.

Another ferrule, made from injection molded plastic, is disclosed in U.S. Pat. No. 4,834,487. This is a one piece ferrule that has a precision front section and a body portion formed such that the precision front section is free of molding flash.

The ferrules disclosed in the above patents have a number of drawbacks for high volume production. While the one piece ferrules have the necessary structural integrity, their production processes are limited by the high precision required at the front section. The two piece ferrules allow the manufacturing process and materials selection to be tailored to the particular sections of the ferrule, allowing for optimization of the manufacturing process. However, the two piece ferrules require joining features, such as threads, bores, or bosses, be incorporated. These additional features can impose the same precision requirements on the rear body section that were trying to be avoided.

What is needed is a ferrule that may be produced economically and in high quantities while taking advantage of the different precision and material requirements of the front section versus the rear body section, while still maintaining the precision required at the front section so that the optical fiber therein may be reliably coupled to the fiber optic device.

SUMMARY OF THE INVENTION

The overmolded alignment ferrule of this invention is used in fiber optic connectors to couple an optical fiber therein to a fiber optic device. The ferrule has a preformed precision portion having a front section for aligning the optical fiber therein with the fiber optic device and an overmolded body portion configured for incorporating the alignment ferrule into the fiber optic connector. The precision portion also has a rear section, rearward of the front section, having an anti-displacement feature thereupon and a central passage extending therethrough for positioning the optical fiber concentrically with the front section. The overmolded body portion enclasps the anti-displacement feature embedding it therein which prevents relative displacement between the precision portion and the body portion by locking the two portions together. The body portion extends rearwardly from the precision portion and is configured to incorporate the alignment ferrule into the particular connector. The body portion has a fiber receiving opening in communication with the central passage of the precision portion to guide the optical fiber thereto.

It is an object of this invention to provide an alignment ferrule having separately producible precision and body portions that are integrally interconnected to form an essentially unitary ferrule.

It is a feature of this invention that the alignment ferrule may be produced with a pre-formed high precision portion to align the optical fiber with a mating fiber optic device that is overmolded by a body portion of lesser precision that incorporates the alignment ferrule into the fiber optic connector. It is another feature of this invention that an anti-displacement feature may be included as part of the precision portion and be embedded within the overmolded body portion, thereby preventing axial or torsional displacement. It is yet another feature of this invention that an anti-flexure feature may be used to minimize flexure of the front section relative the rear section and could be at least partially embedded within the overmolded body portion.

It is an advantage of this invention that the body portion could be overmolded about the precision portion to form a shrink fit seal therebetween to prevent delamination caused by the ingress of moisture. It is another advantage of this invention that a generic precision portion may be overmolded with various body portion configurations. It is a further advantage of this invention that the two part construction of the alignment ferrule enables a shorter core pin to be used in molding the precision portion, thereby effectively stiffening the core pin to minimize critical variations between the central passage and the front section.

DESCRIPTION OF THE DRAWINGS

The invention will now be described by way of example with reference to the accompanying drawings in which:

FIG. 9 is a cross-section of the four-part mold, shown in the closed position, used to overmold the body portion a the precision portion.

DETAILED DESCRIPTION OF THE ILLUSTRATED EMBODIMENT

Figure 1:
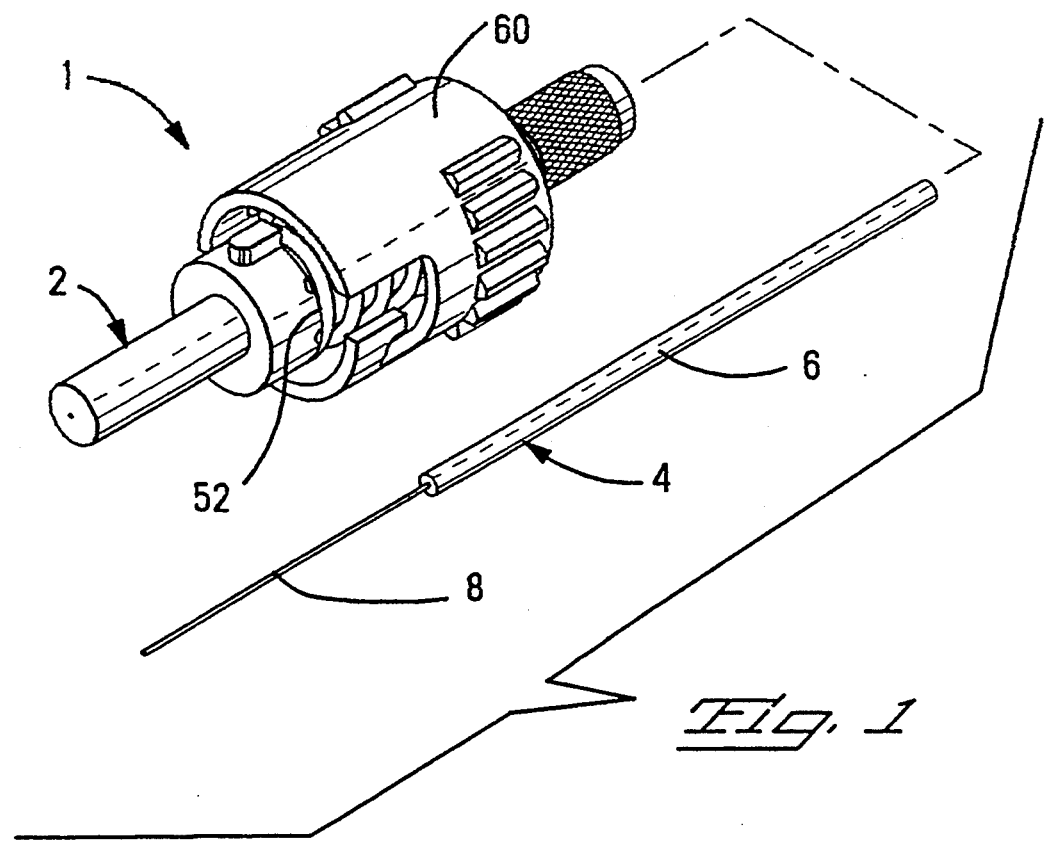
FIG. 1 perspective view of a bayonet-style optical fiber connector and an optical fiber for use therein.

FIG. 1 shows an optical fiber connector 1 having an alignment ferrule 2 for aligning an optical fiber 4 therein with another fiber optic device (not shown). The optical fiber shown has a buffer coated portion 6 and a bare portion 8. This optical fiber 4 could be part of a fiber optic cable (not shown) that may also include strength members and a protective outer jacket. The connector 1 shown in the drawings is intended to be illustrative only and is not meant to limit the present invention. It is envisioned that this invention will be applied to a variety of connector styles, including epoxyless and duplex connectors. The ability to overmold a connector specific body portion about a generic precision portion to form an alignment ferrule is one particularly attractive aspect of the present invention.

Figure 2:
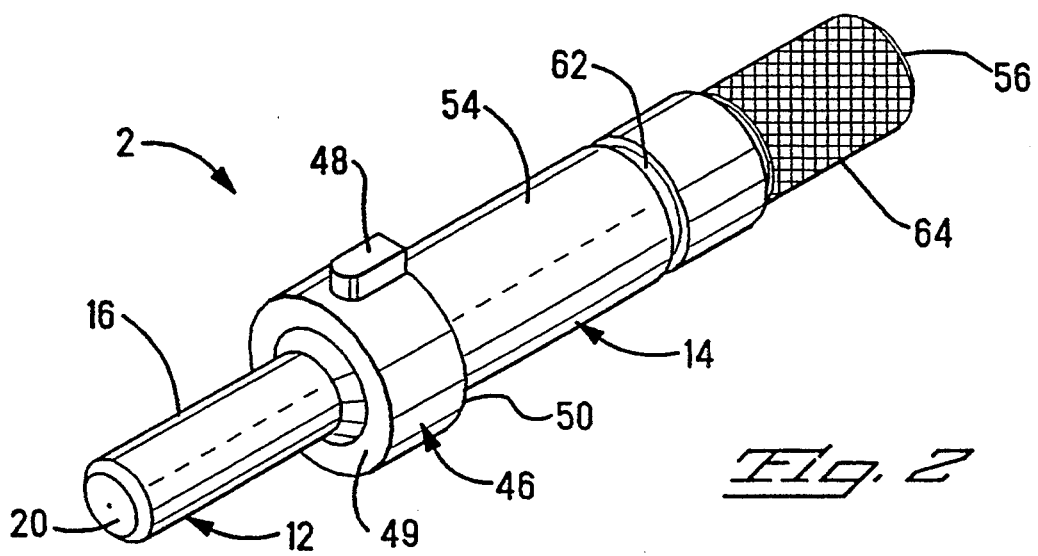
FIG. 2 is a perspective view of an overmolded alignment ferrule usable with the optical fiber connector of FIG. 1.
Figure 3:
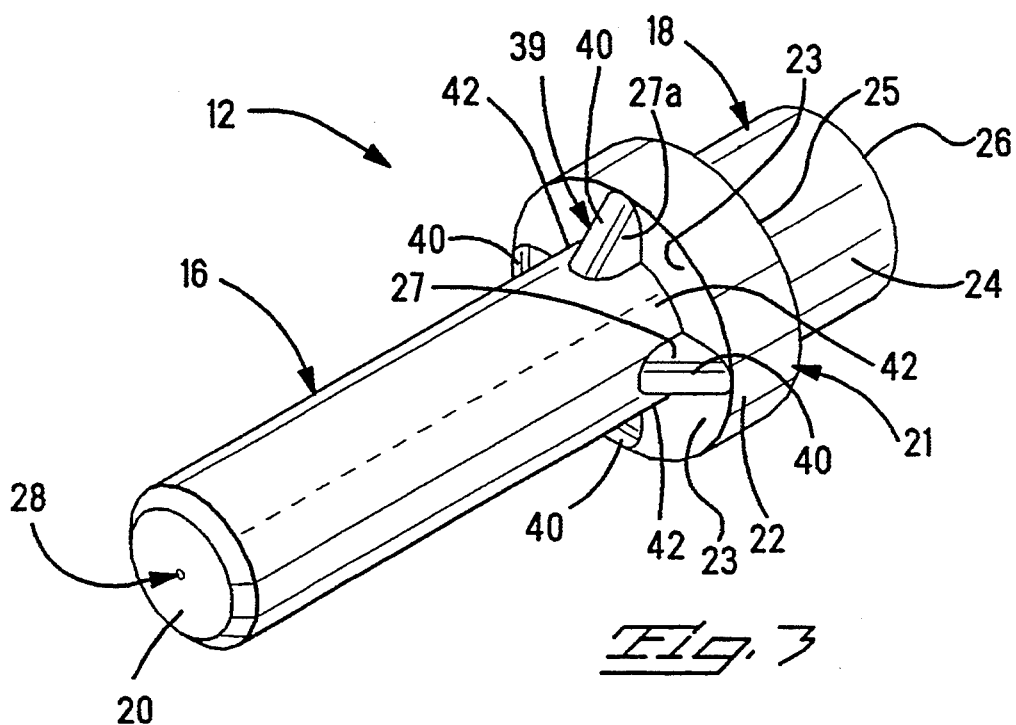
FIG. 3 is a perspective view of the precision portion of the overmolded alignment ferrule of FIG. 2.

As seen in FIGS. 2 and 3, the alignment ferrule 2 of the present invention has a precision portion 12 and an overmolded body portion 14. The precision portion 12 has a front section 16 closely dimensioned for accurate alignment with the other fiber optic device. The overmolded body portion 14 is of lesser precision and is configured to incorporate the ferrule 2 into the fiber optic connector 1 and, where necessary, to assist in positioning and retaining the optical fiber 4.

The precision portion 12 has a has a cylindrical front section 16 and a rear section 18. The front section 16 extends rearward from a front face 20 and is constructed for aligning the ferrule 2 with the fiber optic device by being closely received within a sleeve (not shown) that is aligned with the optical axis of the fiber optic device. The front section 16 is not limited to a cylindrical configuration and may take any shape consistent with the alignment function.

As shown in FIG. 3, the rear section 18 includes an anti-displacement feature 21 that, in its most general form, is a surface irregularity, which when overmolded, will prevent displacement of the precision portion 12 relative the overmolded body portion 14. The anti-displacement feature 21 shown is a collar 22 that extends outward of the front section 16 along the rear section 18. This collar 22 has a forward facing facet 23 and a rearward facing facet 25. When these facets 23, 25 are tightly encapsulated by the overmolded body portion 14, as described below, the precision portion is axially locked in position.

The frictional forces between the overmolded body portion 14 and the precision portion 12 may be insufficient to prevent torsional displacement of one portion relative the other. If so, the anti-displacement feature 21 may include radial facets 27, 27a which, in this embodiment, are opposite facing surfaces of a rib 40. These facets 27, 27a are also tightly encapsulated by the overmolded body portion 14 and prevent torsional displacement of the two portions 12, 14.

The anti-displacement feature 21 may take on numerous forms. The feature 21 could be a series of protrusions or depressions which could be thought of as having a large number of facets with at least some facing forward, rearward, and radially. The feature 21 could also be a chordal section of the rear section 18, such as a flat across the cylindrical surface. The ends of the flat would be the forward and rearward facets, while the chord would function as the radial facet. The collar could have a polygonal profile, instead of cylindrical, where the sides of the polygon would act as radial facets 27, 27a to prevent torsional displacement. There are numerous other configurations within the envisioned scope of this invention. The salient feature being that when the feature 21 is overmolded it is enclasped in a way that locks the precision portion 12 to the body portion 14, thereby preventing relative displacement.

The rear section 18 extends from the collar 22 rearward along a rear sleeve 24 to a fiber receiving face 26. A central passage 28 extends into the precision portion 12 from a fiber receiving face 26 and through the front face 20. The central passage 28 holds the optical fiber 4 within the front face 20 for coupling to the other fiber optic device.

Figure 4:
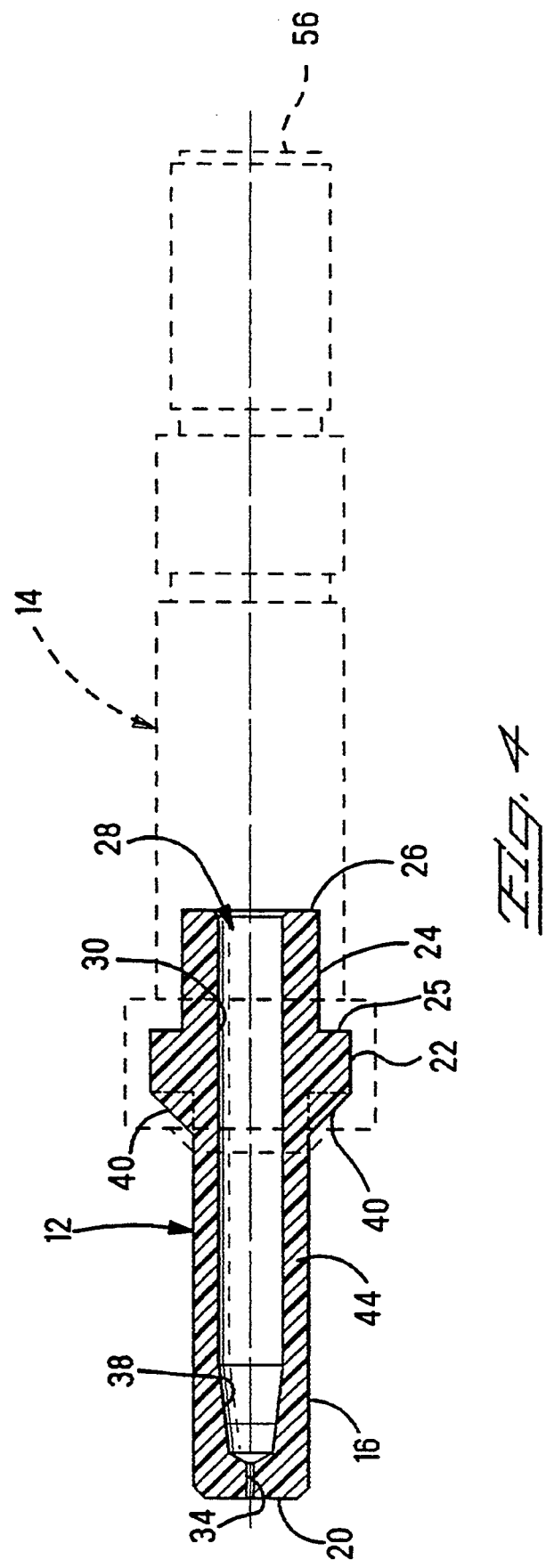
FIG. 4 is a cross-sectional view of the precision portion including a phantom representation of the body portion of the overmolded alignment ferrule.

As shown in FIG. 4, the central passage 28 has a primary bore 30 and a fiber bore 34. The primary bore 30 extends inward from the fiber receiving face 26 to the fiber bore 34 which is concentric with the front section 16. The primary bore 30 is sized to receive the buffer coated portion 6 of the optical fiber 4 therein. There is a constriction between the primary bore 30 and the fiber bore 34 which is where adhesive would typically be placed to bond the optical fiber 4 to the alignment ferrule 2. The fiber bore 34 is sized to closely receive the bare portion 8 of the optical fiber 4.

In addition to the anti-displacement feature 21, an anti-flexure feature 39 may be included in the precision portion 12 to oppose flexure of the front section 16 relative the rear section 18. The anti-flexure feature 39 shown in the drawings is a plurality of ribs 40 extending from the collar 22 forwardly and radially along the front section 16, thereby stiffening the front section 16 relative the rear section 18. The anti-flexure feature 39 acts as a stiffening gusset for the front section 16 and is especially applicable where the central passage 28 is large relative the front section 16, which leaves a thin wall 44 therebetween.

Figure 6:
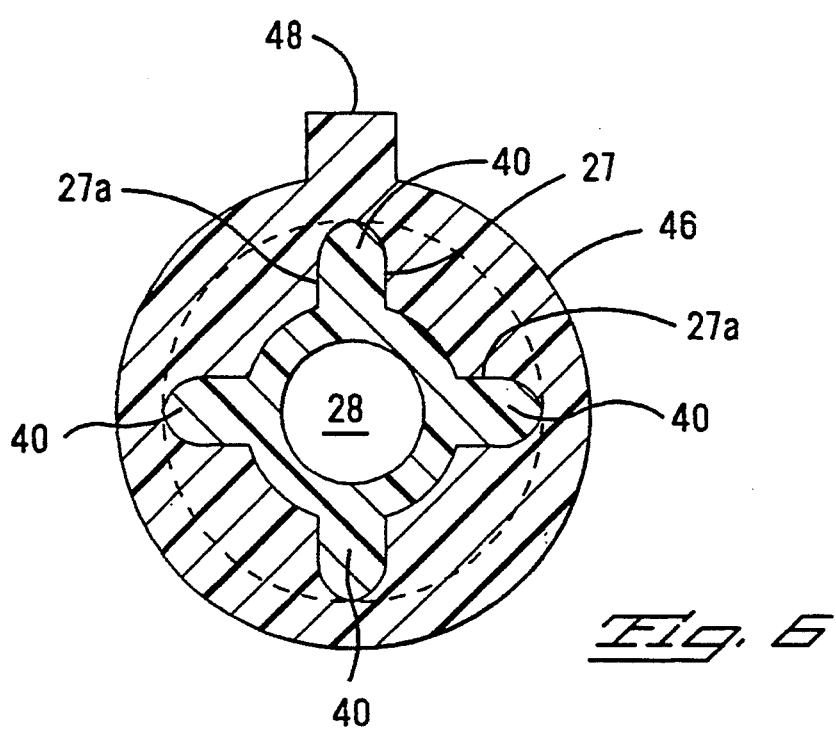
FIG. 6 is a sectional view of the overmolded alignment ferrule taken along line 6—6 of FIG. 5.

These ribs 40 include the radial facets 27, 27a that enhance the anti-displacement aspect of the collar 22. The body portion 14 is torsionally locked to the precision portion 12 when voids 42 between the ribs 40 are overmolded. As described below, the overmolding fills the voids 42 with material of the overmolded body portion 14, thereby embedding the ribs 40 therein, as best seen in FIG. 6, locking the precision portion 14 to the overmolded body portion 16.

The body portion 14 may be manufactured to lesser levels of precision than the precision portion 12 and is configured to incorporate the alignment ferrule 2 into the particular connector 1. The body portion 14 is inherently connector specific and, because it may take on various configurations, is described herein only generally as an example.

Figure 5:
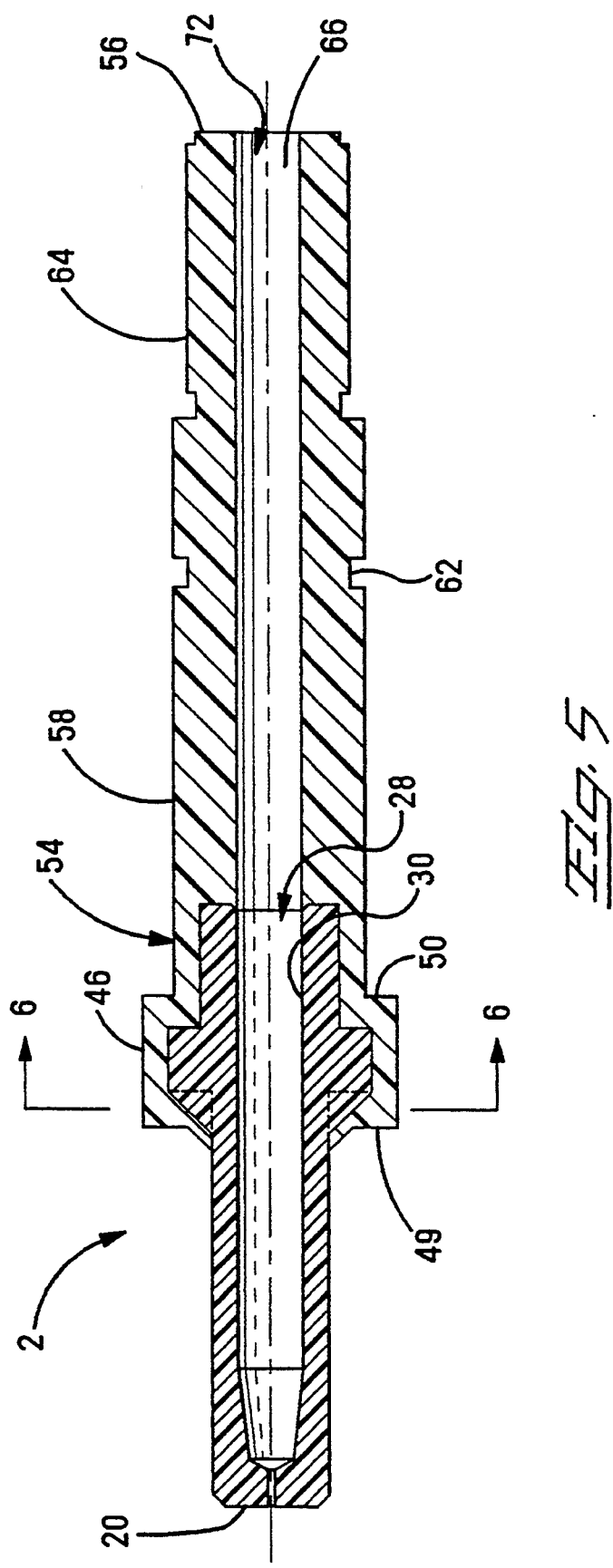
FIG. 5 is a cross-sectional view of the overmolded alignment ferrule.

As shown in FIG. 5, the body portion 14 enclasps the collar 22 and the ribs 40 within a flange 46. This flange 46 has a cylindrical shape with a key 48 thereupon, for mating the connector 1 with the fiber optic device (not shown). The flange 46 has a forward face 49 and a rearward face 50. The rearward face 50 acts as a bearing surface for a coil spring 52 to bias the alignment ferrule 2, and the optical fiber 4 therein, forwardly towards the fiber optic device. The flange 46 can be constructed in numerous other forms and for other uses, such as to prevent the alignment ferrule 2 from rotating relative the connector 1.

A housing 54 extends rearward from the rearward face 50 to a rear face 56. As illustrated, the housing 54 has a primary outer diameter 58 onto which the coil spring 52 and a bayonet housing 60 fit to hold the connector 1 to the fiber optic device. The primary outer diameter 58 includes a groove 62 for receiving a clip (not shown) that holds the bayonet housing 60 in place, enabling the coil spring 52 to act on the alignment ferrule 2. Rearward of the primary outer diameter 58, a retention section 64, over which strength members of an optical fiber cable (not shown) may be held in place.

The fiber receiving opening 66 is connector-specific and may take numerous forms. As shown, a fiber receiving opening 66 extends from a rear face 56 into communication with the central passage 28 of the precision portion 12 to define a continuous passageway 72 for the optical fiber 4 between the front face 20 and the rear face 56. It is this continuous passageway 72 within which the optical fiber 4 is bonded into place.

The overmolded alignment ferrule 2 is constructed by overmolding a body portion 14 onto a pre-formed precision portion 12. The precision portion 12 may be manufactured using injection molding, machining or other methods. The precision portion 12 may be made from a plastic, ceramic or metal. Presently, it is envisioned that the precision portion 12 will be manufactured in high quantities by a plastic injection molding process. An appropriate material, having high strength and thermal stability, is VECTRA, a liquid crystal polymer, supplied by Hoechst-Celanese of Chatham, N.J.

Figure 7:
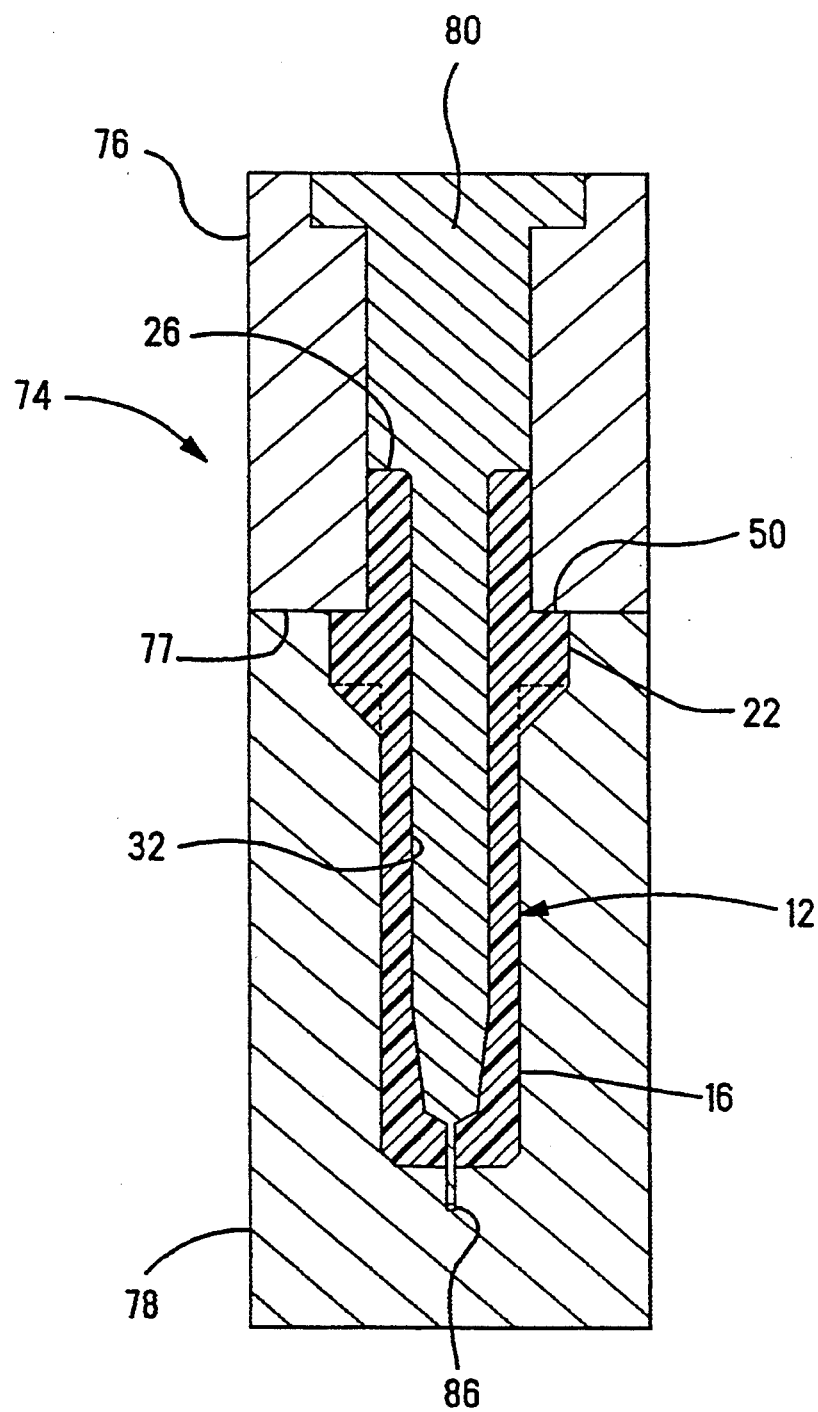
FIG. 7 is a cross-sectional view of the injection mold used to mold the precision portion of the overmolded alignment ferrule in the closed position and showing the precision portion therein.

FIGS. 6 and 7 disclose an injection mold 74 for producing the precision portion 12. The injection mold 74 has an upper mold block 76 and a lower mold block 78 constructed to be linearly separable. A parting line imperfection typically occurs where mold blocks meet, whereby an imperfection is left in the produced piece. To assure the precision required along the front section 16, the mold blocks 76, 78 are constructed to mate somewhere other than along the front section 16, thereby producing a front section 16 free of parting line surface imperfections. In addition, to assure the desired concentric relationship between front section 16 and the fiber bore 34 of the precision portion 12, separation of the mold blocks 76, 78 should occur along the axis of those features 16,34, thereby enhancing the ability of the process to maintain the required concentricity. FIG. 5 shows an injection mold 74 construction that would result in the parting line 77 occurring along the rearward face 50 of the collar 22.

The upper mold block 76 contains a central passage core pin 80 within a upper cavity 82 which defines at least a portion of the rear section 18 of the precision portion 12, including the fiber receiving face 26. The central passage core pin 80 extends from the upper mold block 76 so that when the upper mold block 76 and the lower mold block 78 are closed, the central passage core pin 80 extends into a pin seat 86 within the lower mold block 78. The manufacturability of the satisfactory precision portions 12 is enhanced by keeping the central passage core pin 80 as short as possible, thereby enhancing its stiffness.

Figure 8:
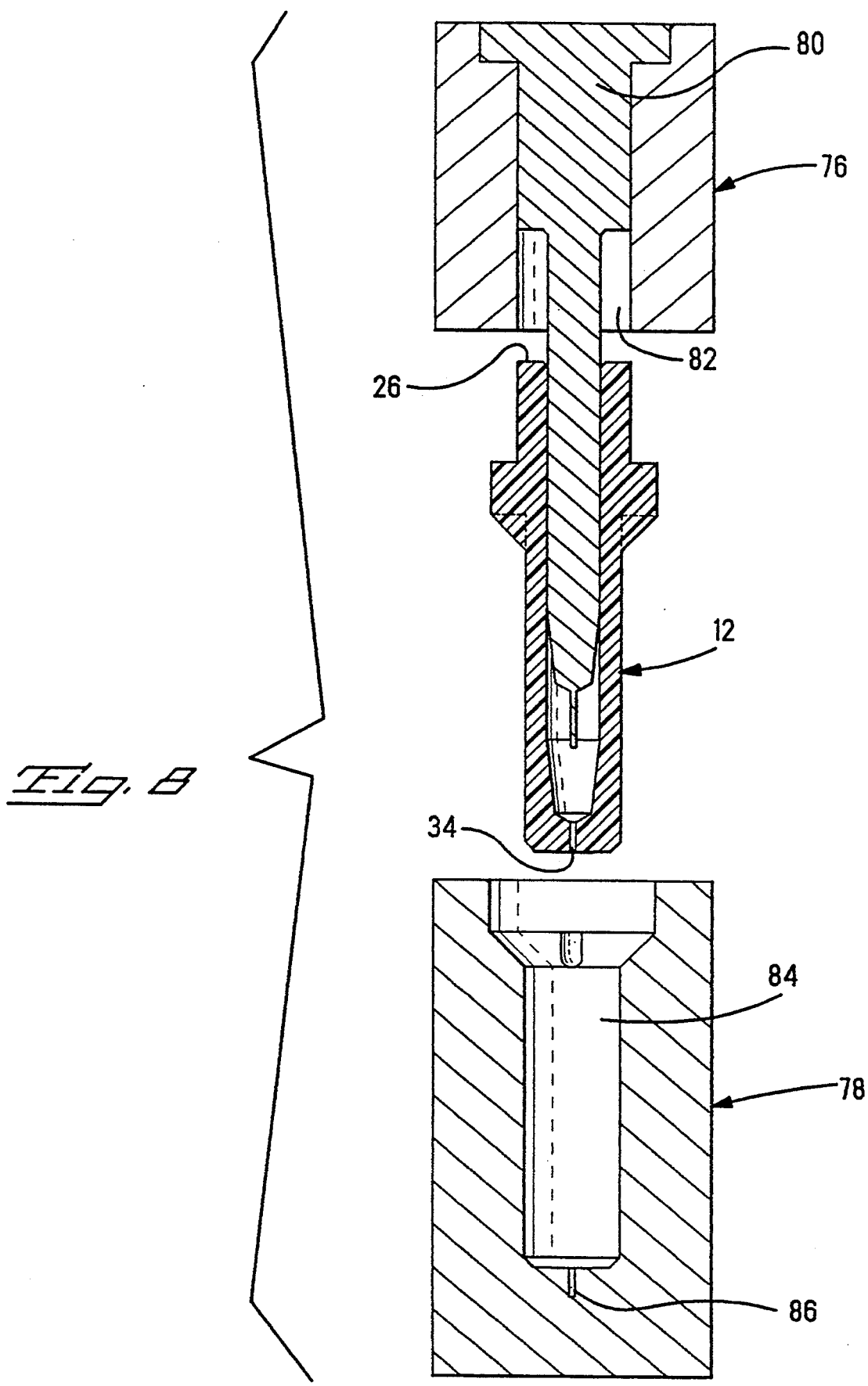
FIG. 8 is a cross-sectional view of the of the injection mold of FIG. 7 in the open position.

A lower cavity 84 defines the front face 20, the front section 16, the collar 22 and the ribs 40. The pin seat 86 receives the central passage core pin 80 and maintains the concentricity of the fiber bore 34 and the front section 16. The mold blocks 76, 78 are closed and fluid material, such as a plastic, is injected into the annular volume defined by the upper cavity 82, the lower cavity 84, the core pin seat 86 and the central cavity core pin 80. The material solidifies therein forming the precision portion 16. Once solidified, the upper and lower mold blocks 76, 78 are separated along the axis of the precision portion 12 and the completed precision portion 12 is ejected, as shown in FIG. 8.

The overmolded alignment ferrule 2 is formed using an overmolding process of injection molding a body portion 14 upon the pre-existing precision portion 12. A lesser degree of precision is required in the manufacture of the body portion 14 due to its limited function of incorporating the alignment ferrule 2 into the connector 1. A different material may be used to form the body portion 14 than was used for the precision portion 12 based on either economical or structural considerations. A particularly advantageous material is a thermoplastic polyester VALOX sold by General Electric Plastics of Pittsfield, Mass. which has a molding temperature sufficiently below the melting temperature of the precision portion 12 so that the precision portion 12 is not adversely effected during the overmolding process.

As shown in FIG. 9, a four part mold 88, having both side action and longitudinal action, is used for forming the body portion 14 about the precision portion 12. The four part mold 88 may incorporate more or less parts depending on the specific configuration of the body portion 14, enabling a wide variety of features to be included in the body portion 14. The four part mold 88 has a top die 90 and a bottom die 92. The bottom die 92 sealably receives the precision portion 12 within a blind bore 94 along the front section 16 preventing bleed of fluid material therebetween during the overmold process.

The top die 90 has a fiber receiving opening core pin 96 that defines the fiber receiving opening 66 in the body portion 14. This core pin 96 extends towards the bottom die 92 such that when the four part mold 88 is closed, with the pre-existing precision portion 12 positioned within the bottom die 92, the fiber receiving opening core pin 96 extends into the central passage 28 of the precision portion 12, thereby sealing the central passage 28 and preventing the fluid material from bleeding therein. It would also be possible to have the fiber receiving core pin 96 abut the fiber receiving face 26 in order to prevent the fluid material from bleeding into the central passage 28.

Two laterally opposing side dies 98, 98a have partial cavities 100, 100a therein which, when the side dies 98, 98a are combined, substantially define the body portion 14 of the overmolded alignment ferrule 2. The lesser precision requirements of the body portion 14, relative the precision portion, allow side motion of the opposing side dies 98, 98a to be used.

Once the four part mold 88 is assembled, a flange cavity 102, that defines the flange 46, is created by the laterally opposing side dies 98, 98a and the bottom die 92. The collar 22 and the ribs 40 of the precision portion 12 are within the flange cavity 102 while the rear sleeve 24 extends therethrough into a body cavity 104 which extends upward from the flange cavity 102. The body cavity 104 has features that correspond to the already described body portion 14. The top die 90 defines the rear face 56 of the body portion 14.

Fluid material is inserted into the annular volume defined by the precision portion 12, the flange cavity 102, the body cavity 104 and the fiber receiving opening core pin 96. The fluid material is solidified and the mold is separated. The top die 90 is extracted along A—A. The laterally opposing side dies 98, 98a are separated along B—B. Once those dies 90, 98, 98a have been separated, the completed overmolded alignment ferrule 2 may be removed from the lower die 92.

It will be appreciated that the present invention has significant advantages over prior art optical fiber alignment ferrules. The present invention provides for the manufacture of a highly precise precision portion attached to a lower precision body portion while still maintaining the function and structural integrity of a single piece ferrule. The body portion may be overmolded upon the precision portion to provide a shrink fit seal that will prevent delamination of the two portions. Finally, in embodiments of the invention that utilize a molded precision portion, the present invention enables shorter core pins to be used which enables more reliable production to be recognized.

It should be recognized that the above-described embodiments and forms, constitute the presently preferred forms of the invention and that the invention may take numerous other forms, some of which have been described above. Accordingly, the invention should be only limited by the scope of the following claims.

We claim:

1. An overmolded alignment ferrule for an optical fiber connector used to couple an optical fiber therein to a fiber optic device, the overmolded alignment ferrule comprising:
    a precision portion having a front section for aligning the optical fiber with the fiber optic device, a rear section extending rearward from the front section portion for positioning the optical fiber concentrically with the front section, an anti-flexure feature on said precision portion, and
    an overmolded body portion for incorporating the alignment ferrule into the fiber optic connector, where the overmolded body portion closely enclasps the anti-displacement feature and securely embeds the antidisplacement feature therein to prevent displacement of the precision portion relative the body portion, the overmolded body portion extends rearward therefrom and has a fiber receiving opening in communication with the central passage of the precision portion for receiving the optical fiber.

2. The overmolded alignment ferrule of claim 1, wherein the overmolded body portion enclasps the anti-flexure feature.

3. The overmolded alignment ferrule of claim 1, wherein the precision portion is molded.

4. The overmolded alignment ferrule of claim 3, wherein a parting line imperfection is along the rear section of the precision portion.

5. The overmolded alignment ferrule of claim 1, wherein the precision portion is plastic.

6. The overmolded alignment ferrule of claim 1, wherein the precision portion and the body portion are different materials.

7. The overmolded alignment ferrule of claim 1, wherein the anti-displacement feature is a collar that extends outward beyond the front section of the precision portion.

8. The overmolded alignment ferrule of claim 7, wherein said antiflexure feature is a rib extending from the collar.

9. The overmolded alignment ferrule of claim 7, wherein a plurality of ribs extend from the collar along the precision portion.

10. An overmolded alignment ferrule for an optical fiber connector for coupling an optical fiber to a fiber optic device, the overmolded alignment ferrule comprising:
    a precision portion having
        a front section for aligning the optical fiber therein to the fiber optic device;
        a rear section extending rearward from the front section;
        a central passage extending through the precision portion for holding the optical fiber concentrically with the precision portion,
        an anti-displacement feature upon the rear section having
            a forward facing facet, a rearward facing facet,
        an antiflexure feature; and
    an overmolded body portion configured to incorporate the overmolded alignment ferrule into the fiber optic connector, where the overmolded body portion enclasps the anti-displacement feature, tightly embedding at least a portion of the facets to lock the portions together and to oppose displacement therebetween, the overmolded body portion extends rearward therefrom and has a fiber receiving opening in communication with the central passage of the precision portion for guiding the optical fiber into the central passage.

11. The overmolded alignment ferrule of claim 10, wherein the anti-displacement feature includes a radial facet that is enclasped by the body portion and tightly embedded therein to oppose torsional displacement of the two portions.

12. The overmolded alignment ferrule of claim 10, wherein said anti-flexure feature is a rib.

13. The overmolded alignment ferrule of claim 10, wherein the anti-displacement feature is a collar that extends from the rear section outward of the front section.

14. The overmolded alignment ferrule of claim 13, wherein the collar includes the forward facing facet and the rearward facing facet and the anti-flexure feature is a rib that extends from the forward facing facet towards the front section.

15. The overmolded alignment ferrule of claim 14, wherein the rib is enclasped by the body portion and at least partially embedded therein.

16. The overmolded alignment ferrule of claim 14, wherein the anti-flexure feature is a plurality of ribs extending from the forward facing facet towards the front section and having radial facets thereupon, the plurality of ribs defining voids therebetween into which the body portion is formed as the body portion enclasps the collar and the plurality of ribs.

17. The overmolded alignment ferrule of claim 10, wherein the precision portion is molded and the front section is devoid of imperfections in the form of a mold parting line.

* * * * *